United States Patent [19]
Serra et al.

[11] Patent Number: 5,407,726
[45] Date of Patent: Apr. 18, 1995

[54] CONFORMABLE HIGH TEMPERATURE RESISTANT TAPES

[75] Inventors: Jerry Serra, Chelmsford; Aboud Mamish, Natick; Leonard D. DeCoste, Jr., N. Andover, all of Mass.

[73] Assignee: The Kendall Company, Mansfield, Mass.

[21] Appl. No.: 925,835

[22] Filed: Aug. 7, 1992

Related U.S. Application Data

[63] Continuation-in-part of Ser. No. 436,990, Nov. 14, 1989, abandoned.

[51] Int. Cl.$^6$ ............................................. C09J 7/02
[52] U.S. Cl. .................................. 428/161; 428/261; 428/343; 428/345
[58] Field of Search ............... 428/343, 345, 353, 354, 428/161, 261

[56] References Cited

U.S. PATENT DOCUMENTS

| | | | |
|---|---|---|---|
| 2,969,143 | 1/1961 | DeBell | 428/353 |
| 4,153,747 | 5/1979 | Young | 428/40 |
| 4,992,331 | 2/1991 | DeCoste | 428/343 |

OTHER PUBLICATIONS

Mark, H.; Ind. Eng. Chem. 34, 1343 (1942).

*Primary Examiner*—Jenna L. Davis
*Attorney, Agent, or Firm*—Alvin Isaacs

[57] ABSTRACT

A conformable adhesive tape comprising a chlorinated polymeric backing carrying on one surface thereof a pressure sensitive adhesive layer, the backing layer being crosslinked whereby the backing layer is characterized as being high temperature resistant, the backing layer further being characterized as being conformable at high temperature; the adhesive layer also being crosslinked whereby to substantially increase its resistance to shear at high temperature; and a process for making same.

2 Claims, No Drawings

CONFORMABLE HIGH TEMPERATURE RESISTANT TAPES

This application is a continuation-in-part of application Ser. No. 436,990, filed Nov. 14, 1989, now abandoned.

BACKGROUND OF THE INVENTION

The present invention relates in general to pressure sensitive adhesive tapes and more particularly to automotive harness tapes which in the course of normal driving are subjected to elevated temperatures of on the order of 135° C. or greater.

The invention is an improvement over Applicant's U.S. Pat. No. 4,992,331 filed Sep. 30, 1988 and assigned to the present assignee. The prior application is hereby incorporated by reference. As stated therein it is highly desirable for such industrial adhesive tapes to possess characteristics such as impermeability to liquid, chemical resistance, flame retardancy, non-corrosion, tearability in the cross direction and conformability. Conformability is particularly desirable for application to automotive harness tapes which require tight wrapping around small objects. In accordance with the teachings of the aforementioned application, the backing layer comprises a chlorinated polyethylene.

While the presently available industrial tapes possess the aforementioned advantages, they do have disadvantages, one important disadvantage of which is lack of high temperature resistance. Commercially available tapes have optimal high temperature resistance in the range of 105° C. Thus they do not resist temperatures of greater than 105° C. for extended periods of time. Moreover, generally speaking, commercially available industrial tapes which are conformable are not high temperature resistant and high temperature resistant tapes are not conformable. (Conformability is subjectively defined by the capacity to wrap small objects, and is objectively defined by the American Society for Testing and Materials (ASTM) 1388 Cantilever method.) Thus high temperature resistance and conformability are considered to be mutually exclusive characteristics in the prior art. Yet the need exists in the industry and particularly the automotive industry for harness tapes which are both conformable high temperature resistant. This need is particularly felt in the automotive industry wherein the harness wraps are subjected to high temperatures during the operation of the engine. The backing of prior art tapes which are conformable, disintegrates at high temperatures, whereas the backing in prior art high temperature resistant tapes disassociates from the adhesive. Likewise, the adhesive may become less viscous at high temperatures which severely decreases the adhesive joint strength.

Accordingly, the primary objective of the present invention is to fulfill the longfelt need for a conformable high temperature resistant pressure sensitive adhesive tape which maintains the structural and functional integrity of both its backing and adhesive layer at high temperatures ranging beyond 135° C.

BRIEF DESCRIPTION OF THE INVENTION

The objective of the present invention is met in a novel manner by providing a flame-retardant chlorinated polymeric backing layer carrying a pressure-sensitive adhesive layer on one surface thereof, both the backing and the adhesive layer being crosslinked.

DETAILED DESCRIPTION OF THE INVENTION

The primary task of the present invention is to develop a flame-retardant conformable automotive harness tape which maintains its function and structural integrity up to at least 135° C. and preferably up to 150° C. throughout its normal usage with or without employing a reinforcing scrim. Since the automotive industry is progressing towards higher engine operating temperatures, a high temperature resistant harness tape is highly desired. The characteristics of such a tape must include retention of conformability, tensile strength, structure, barrier properties and adhesive properties at high temperatures.

The novel flame-retardant conformable adhesive tape of the present invention is characterized by comprising a chlorinated polymeric backing carrying on one surface thereof a pressure sensitive adhesive layer, the backing layer being crosslinked whereby the backing layer is characterized as being high temperature resistant, the backing layer further being characterized as being conformable at high temperatures, the adhesive layer also being crosslinked whereby to substantially increase its resistance to shear force at high temperatures.

In accordance with the present invention the preferred backing material consists essentially of from about 26 to about 42 percent by weight of chlorine in chlorinated polyethylene and about 58-74 percent polyethylene in a chlorinated polyethylene and polyethylene blend. While not essential to the practice of this invention, it may also contain other per se known ingredients to perform specific desired functions, e.g., a heat stabilizer such as barium-cadmium, lead or the others disclosed on pp 503-4, Volume 6, Second edition of the "Encyclopedia of Polymer Science and Engineering" by W. L. Young and R. R. Blanchard, John Wiley and Sons (1985); antioxidants such as the known hindered amine antioxidants; colorants such as carbon black, etc.

For suitable pressure-sensitive adhesives, mention may be made of acrylics and rubber-based adhesives of per se known description, e.g., a natural or synthetic rubber elastomer. A typical adhesive of this description may include a blend of natural rubber, tackifier and other reagents performing specific desired functions. The selection of the appropriate adhesive will at least in part be dependent upon the particular substrate to which it is to be adhered and in any event will be a matter of individual choice within the expected judgement of the skilled worker. Since the selection of the particular adhesive from those known in the art per se comprises no part of this invention, they need not be discussed in further detail.

The crosslinking agent may be chemical agent or irradiation, the latter being preferred. As suitable crosslinking agents, mention may be made of organic peroxides and amine accelerator/sulfur donor type systems, exemplary of which is thiadiazole. The selection of one chemical crosslinking agent over another depends on the desired results. The peroxide cures are preferred when extra scorch safety, bin stability, low compression set and heat-aging at 300°-325° F. are required, whereas thiadiazole cures over a wider range of temperature and pressure conditions while generating fewer volatile by-products than peroxides.

Irradiation, the preferred crosslinking agent, may be accomplished by any of the known techniques, exemplary of which are gamma, alpha and preferably electron beam. The preferred dosage ranges from about 5 to about 20 megarads (Mrads). In functional terms, crosslinking to the extent of at least 40 percent by weight of gel content (% of insoluble material) is preferred to instill optimum high temperature resistance.

In an alternate embodiment, where a more stable bond between the backing and the adhesive layer is desired, it is contemplated that a tie coat may be employed. Particularly useful materials for use as tie coats include polyolefin copolymers, particularly polyethylene copolymers such as ethylene methyl acrylate, ethylene vinyl acetate, ethylene acrylic acid, etc. Other useful tie coat materials may be readily suggested to those skilled in the art in the light of this description. In any case, in accordance with this invention the tie coat will also be crosslinked along with the backing and adhesive layer.

In still a further embodiment, a woven or nonwoven scrim may be incorporated into the tape to enhance tearability and strength. The preferred scrim comprises a synthetic fiber woven cloth, preferably polyester. However, it is not necessary for all the fibers to be synthetic and the preferred cloths will in fact contain up to 50% cotton in the warp direction in order to facilitate evenness in finger tearability without sacrificing flame retardance. As will be appreciated by those skilled in the art, when a scrim is employed, a portion of the adhesive layer will be present in the interstices of the scrim. Preferably, a tie coat will be contained along with the scrim so as to provide a laminar product providing the requisite stability against delamenation or separation.

The preferred cloths are of the type described in the aforementioned U.S. Pat. No. 4,303,724 having polyester false-twist or texturized yarns in the filling direction. As previously stated, the warp yarn may and preferably will be a blend of cotton and polyester. For instance, a tape made in accordance with this invention employing a woven cloth of the foregoing description having a 75-25 polyester/cotton blend in the warp permitted satisfactory finger tearability in the cross direction. However, slightly improved tearability was obtained with a 50—50 polyester/cotton warp blend. In any case, the preferred fabrics will contain no more than twenty texturized (false-twist) yarns per inch in the filling direction; and no more than 35 yarns per inch in the warp.

Accordingly, as used herein and in the appended claims, the phrase "woven cloth comprising a synthetic fiber" or "woven cloth comprising polyester" denotes a woven cloth in which the yarn in this filling direction is a synthetic fiber or polyester (as the case may be) and the yarn in the warp is at least 50% synthetic fiber or polyester, i.e., may include as much as 50% other yarns, e.g. cotton.

Manufacture of the novel tapes comprises known processes such as calendering, extrusion and electron beam irradiation and as such comprise no part of this invention.

The novel tapes of this invention can be assembled by individually producing and sequentially coating the components parts. For example, the backing, tie coat and scrim may be individually supplied by a per se well known coextrusion coating operation to provide a laminar structure of these three components. An adhesive layer may then be coated onto the cloth substrate by known coating techniques, e.g. calendering, casting, or extrusion. In embodiments not containing a tie coat or scrim, the backing as well as the adhesive layer may be provided in a single calendering operation. Following assembly, the resulting tape may then be crosslinked, e.g. by subjecting it to irradiation, as heretofore mentioned.

The following examples show by way of illustration and not by way of limitation the practice of this invention.

EXAMPLE 1

A tape was constructed by coextruding tie coat comprising 0.25-0.5 mils of ethylene methyl acrylate; and a 2.0-2.5 mil film comprising a chlorinated polyethylene blend comprising 24% by weight of chlorine onto a 20×10 cloth (having 20 polyester yarns per inch warp, understood to be 200 denier, 96 filament; and 10 false twist yarns per inch of filling). Lastly, a 1.5 mil thick layer of pressure sensitive rubber based adhesive was calendered onto the prepared backing. The resulting tape was irradiated through the backing with an electron beam to a dosage of on the order of about 10 Mrads.

EXAMPLE 2

Onto a 5 mil backing sheet of 24% by weight of chlorine to polyethylene in a chlorinated polyethylene blend was calendered a 1.2-2.0 mil thick pressure sensitive rubber-based adhesive layer. The resultant tape was exposed throughout the backing with an electron beam to a dosage of about 10 Mrads.

The following Tables illustrate the novel characteristics of the present invention objectively in the form of test data. Table I specifically illustrates a tape constitution including a cloth scrim and tie coat prepared as described in Example 1 being exposed to 0 and 10 Mrads. Tensile strength, elongation and adhesion to backing were subsequently measured.

TABLE I

| Dose (Mrad) | 0 | 10 |
| --- | --- | --- |
| Adhesion to Steel (oz/in) | 61 | 52 |
| Adhesion to Backing (oz/in) | 32 | 32 |
| Unwind rate 12 in/min (oz/in) | 35 | 74 |
| Unwind I 100 FPM (oz/in) | 52 | >300 |

The data presented in Table I illustrates the effect of irradiation on adhesion to backing by showing a two times greater unwind @ a rate of 12 in/min and a greater than six times increase at a rate of 100 ft/min.

Table II further illustrates the novel characteristics by comparing tensile strength and elongation initially as well as after 1 week of aging at 310° F. after exposure to 0, 5, 10, 15 and 20 Mrads.

TABLE II

| Dose (Mrads) | 0 | 5 | 10 | 15 | 20 |
| --- | --- | --- | --- | --- | --- |
| Tensile (lb/in) | 24 | 25 | 24 | 21 | 22 |
| Initial after 1 wk @ 310° F. | 14* | 10 | 21 | 17 | 19 |
| Elongation (%) | 12 | 13 | 13 | 12 | 13 |
| Initial after 1 wk @ 310° F. | 12 | 15 | 16 | 18 | 16 |

*Backing melted, only the cloth remained.

The aforementioned data illustrate that irradiation allows for maintaining structural integrity of the tapes at high temperatures whereas the non-irradiated tapes' backings melted after 1 week of aging @ 310° F.

Table III illustrates comparative test results namely between a tape produced in accordance with Example 1 and a typically commercially available polyvinyl chloride (PVC) tape which is the best high temperature resistant tape known to applicant to be presently available on the market.

TABLE III

|  | Example 1 | PVC Tape |
|---|---|---|
| Tensile (lb/in) | 24 | 28 |
| 72 hr. @ 121° C. | 19 | 34 |
| 72 hr. @ 135° C. | 11 | 21 |
| 168 hr. @ 121° C. | 16 | 31 |
| 168 hr. @ 135° C. | 12 | 0 |
| Elongation (%) (lb/in) | 16 | 185 |
| 72 hr. @ 121° C. | 13 | 191 |
| 72 hr. @ 135° C. | 9 | 0 |
| 168 hr. @ 121° C. | 13 | 36 |
| 168 hr. @ 135° C. | 7 | 0 |

TABLE III

|  | Example 1 | PVC Tape |
|---|---|---|
| Flexural Rigidity (mg cm) as measured by ASTM D 1388 Cantilever guidelines | 151 | 1104 |
| 72 hr. @ 121° C. |  | no overhang |
| 72 hr. @ 135° C. | 1426 | >11,320 |

Table III demonstrates the invention's maintenance of Tensile and Elongation properties at high temperatures and most importantly flexibility at high temperature aging. The flexibility date obtained in the ASTM D 1388 Cantilever guideline shows a non-irradiated polyvinyl chloride tape whose flexibility is not measurable by this method, i.e. it is so rigid that it does not flex to an extent measurable under ASTM guidelines.

Table IV illustrates the novel characteristics of a tape manufactured in accordance with Example 2.

TABLE IV

| | Heat Aging of Example 2 Backing | | |
|---|---|---|---|
| Variation | 1 | 2 | 3 |
| Thickness (mils) | 2.2 | 2.4 | 2.6 |
| Dose (Mrad) | 10 | 15 | 20 |
| Initial Tensile (lb/in) | 4.6 | 5.3 | 5.0 |
| % Retention | | | |
| 1 wk, 121° C. | 93 | 88 | 102 |
| 135° C. | 102 | 96 | 100 |
| 154° C. | 72 | 72 | 78 |
| 3 wk, 121° C. | 91 | 88 | 100 |
| 135° C. | 91 | 88 | 90 |
| 154° C. | 72 | 74 | 94 |
| Initial Elongation (%) | 231 | 259 | 262 |
| % Retention | | | |
| 1 wk, 121° C. | 140 | 117 | 119 |
| 135° C. | 143 | 122 | 111 |
| 154° C. | 123 | 107 | 92 |
| 3 wk, 121° C. | 129 | 111 | 119 |
| 135° C. | 139 | 117 | 105 |
| 154° C. | 35 | 20 | 18 |
| Modulus (pounds per square inch) | | | |
| Initial | 8300 | 7000 | 8000 |
| 1 wk, 121° C. | 8500 | 7000 | 7300 |
| 135° C. | 7800 | 7500 | 7600 |

TABLE IV-continued

| | Heat Aging of Example 2 Backing | | |
|---|---|---|---|
| Variation | 1 | 2 | 3 |
| 154° C. | 7000 | 6300 | 6900 |
| 3 wk, 121° C. | 8200 | 7800 | 7960 |
| 135° C. | 6880 | 7650 | 7740 |
| 154° C. | 11,410 | 20,900 | 20,900 |

Table IV illustrates maintenance of Tensile strength, elongation, and modulus at 135° C. over a three-week aging period.

TABLE V

| Flexural Rigidity after Aging (Test Method-ASTM D 1388 Cantilever)-64 (Reapproved 1975) | |
|---|---|
| Example 1 | 151 |
| Example 2 | 87.5 |
| Polyvinyl Chloride Tape | 1104 |

TABLE VI

| Flexibility after 1 week @ 275° F. when tapes are applied to automotive wires | |
|---|---|
| PVC | Example 2 |
| cracks and falls from wire bundle when flexed | remains intact when flexed |

The data presented in Table V establishes the simultaneous conformability as well as high temperature resistant property of the invention after aging the components of Table III. Notably, the Polyvinyl chloride tape is 10 times less flexible, i.e. less conformable. This lack of flexibility results in cracking and brittleness at high temperatures as seen in Table VI.

Since certain changes may be made without departing from the scope of the invention herein described, it is intended that all matter contained in the foregoing description, including examples, shall be taken as illustrative and not in a limiting sense.

What is claimed is:

1. A harness wrap comprising an automotive harness wrapped with a flame retardant conformable adhesive tape comprising a chlorinated polymeric backing carrying on one surface thereof a pressure-sensitive adhesive layer, the backing layer being crosslinked whereby the backing layer is characterized as being high temperature resistant for an extended period of time, the backing layer further being characterized as being conformable at high temperature, the adhesive layer also being crosslinked whereby substantially to increase its resistance to shear at high temperature, the tape thereby being characterized by its usefulness in wrapping small objects which are subjected to high temperature over extended period of time.

2. A harness wrap comprising an automotive harness wrapped with a flame-retardant conformable adhesive tape comprising a chlorinated polymeric backing carrying on one surface thereof, in order, a tie coat, a reinforcing scrim and an adhesive layer, the backing layer being crosslinked to the extent of at least about 40 percent of its gel content whereby the backing layer is characterized as being high temperature resistant for an extended period of time, the adhesive layer also being crosslinked whereby substantially to increase its resistance to shear at high temperature, the tape being characterized by its usefulness for wrapping small objects which are subjected to high temperature over extended periods of time.

* * * * *